(Model.)

2 Sheets—Sheet 1.

H. B. STEVENS.
APPARATUS FOR SIZING ORANGES AND OTHER FRUIT.

No. 247,428.  Patented Sept. 20, 1881.

Witnesses.
Jas. E. Hutchinson.
Frank P. Prindle

Inventor.
H. B. Stevens, by
Geo. S. Prindle, his Atty (Model.)
2 Sheets—Sheet 2.
H. B. STEVENS.
APPARATUS FOR SIZING ORANGES AND OTHER FRUIT.
No. 247,428. Patented Sept. 20, 1881.
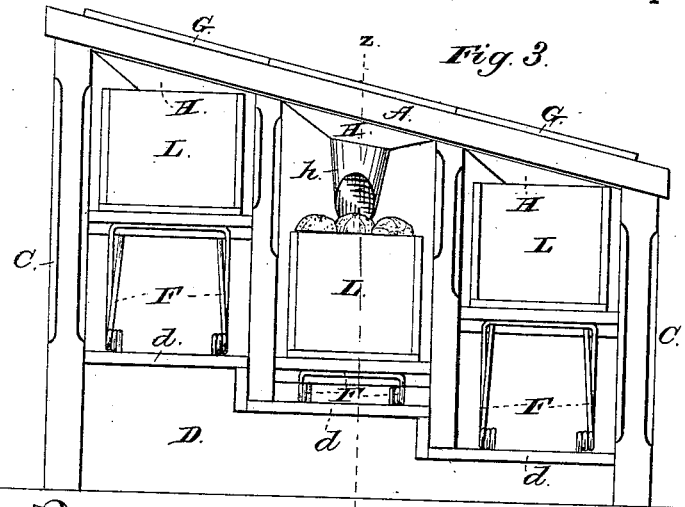
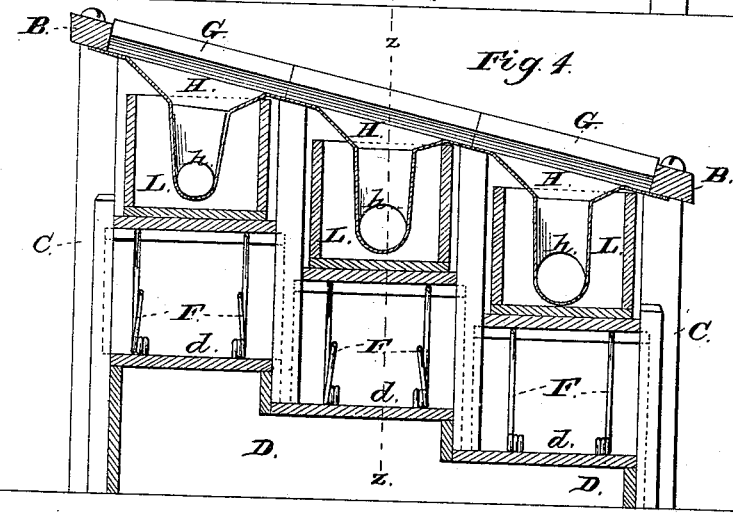
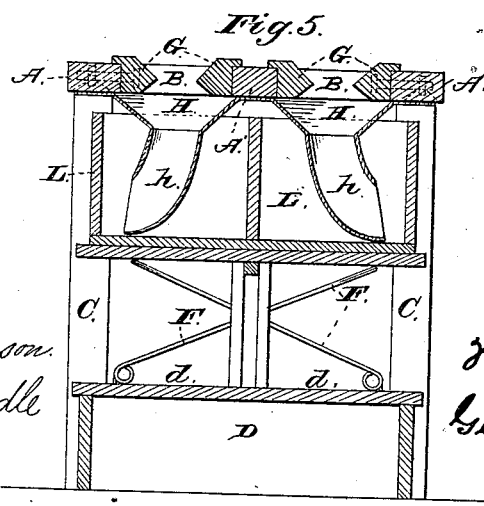

UNITED STATES PATENT OFFICE.

HOWARD B. STEVENS, OF CITRA, FLORIDA.

APPARATUS FOR SIZING ORANGES AND OTHER FRUIT.

SPECIFICATION forming part of Letters Patent No. 247,428, dated September 20, 1881.

Application filed August 12, 1881. (Model.)

*To all whom it may concern:*

Be it known that I, HOWARD B. STEVENS, of Citra, in the county of Marion, and in the State of Florida, have invented certain new and useful Improvements in Apparatus for Sizing Oranges and other Fruit; and I do hereby declare that the following is a full, clear, and exact description thereof, reference being had to the accompanying drawings, making a part of this specification, in which—

Figure 1:
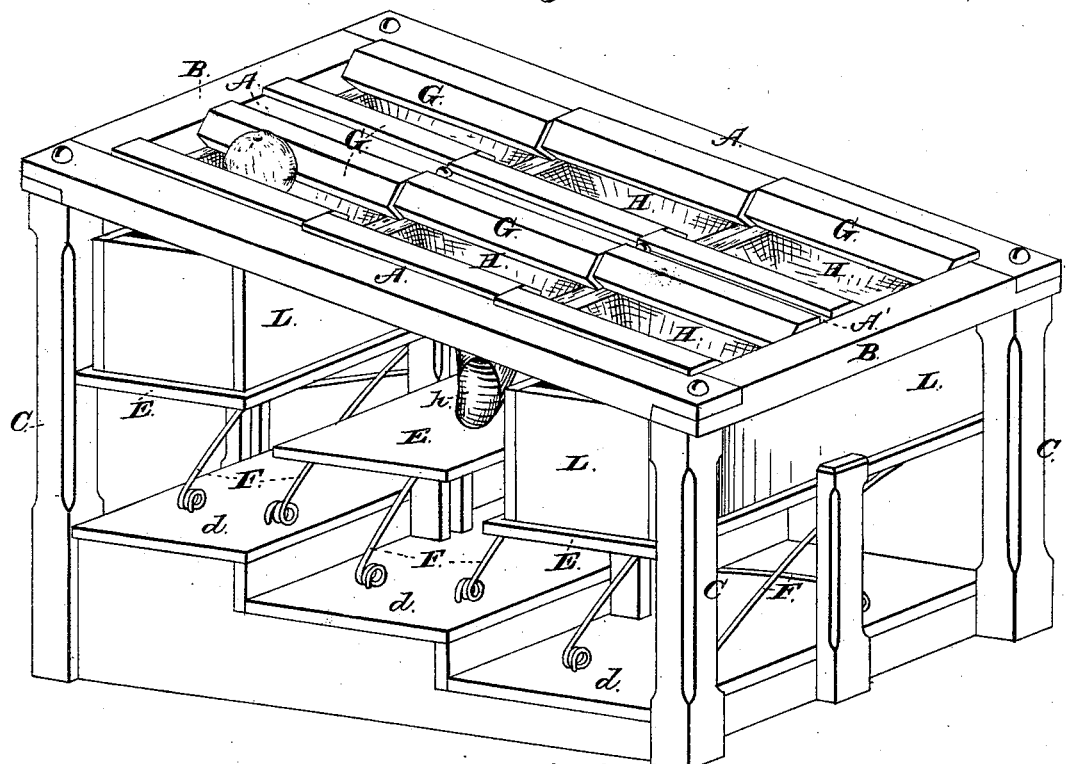
Figure 2:
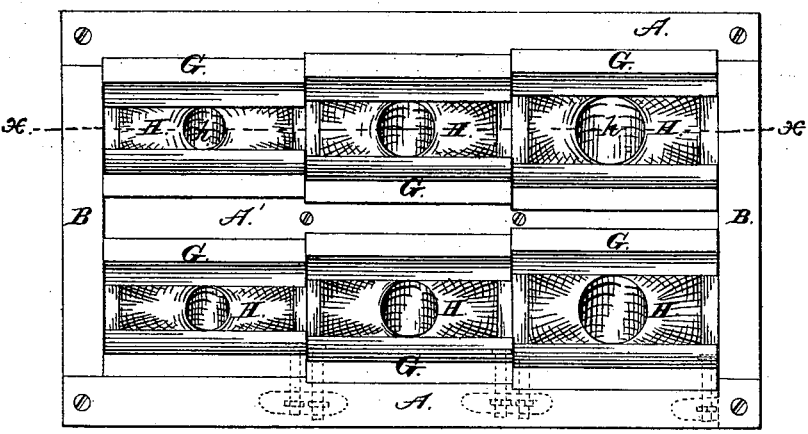

Figure 1 is a perspective view of my apparatus as arranged for use. Fig. 2 is a plan view of the upper side of the same. Fig. 3 is a side elevation of said apparatus. Fig. 4 is a vertical section upon line $x\,x$ of Fig. 2, and Fig. 5 is a like view upon line $z\,z$ of Figs. 3 and 4.

Letters of like name and kind refer to like parts in each of the figures.

The object of my invention is to facilitate the sizing of oranges; and to this end it consists, principally, in an apparatus for sizing fruit having an inclined open-bottom chute, provided with sectional adjustable sides, whereby several widths of opening may be produced through which the fruit may drop while rolling down said chute, substantially as and for the purpose hereinafter specified.

It consists, further, in combining with apparatus for sizing fruit a vertically-movable platform for sustaining a fruit-box, supported by or upon springs, and adapted to automatically drop downward as said box is filled, substantially as and for the purpose hereinafter shown.

It consists, further, in combining with the open bottom of the inclined chute flexible funnels and tubes for conveying fruit to the receiving-boxes, substantially as and for the purpose hereinafter set forth.

It consists, finally, in the apparatus described, in which the inclined open-bottomed chute, having several widths of opening, the flexible funnels and tubes, and the vertically-movable spring-supported platforms are combined to operate substantially as and for the purpose hereinafter specified.

In the annexed drawings, A and A represent three rails, which are arranged equidistant in parallel lines, and are connected together at their ends by means of two end rails, B and B, the whole having a general rectangular form.

The frame described rests upon and is supported by four posts, C and C, which are placed beneath its corners and have such relative length as to give to said frame a longitudinal inclination sufficient to cause fruit placed upon one end to roll freely toward the opposite lower end.

Placed between and connecting the lower ends of the posts C and C is a base, D, which fills the space horizontally and has its upper side formed by a series of steps, $d$, that correspond in width to the width of an ordinary fruit-box, and have such relative height as to cause the general inclination of the upper side of said base to correspond to the inclination of the top frame.

Above each step $d$ of the base D is a board, E, which corresponds in size and shape to the upper surface of said step, and is supported by or upon springs F that are secured to and extend upward from the latter, the arrangement being such as to cause said board or platform to be held at the upper limit of its motion, except when sufficient weight is placed upon its upper side to overcome and depress said springs, when said platform will sink downward.

The space between the center rail, A′, and each outer rail, A, is wider than the diameter of the largest orange to be sized, and upon the inner and upper face of each rail is secured a bar, G, which is made adjustable toward and from the opposite bar G, so as to enable the space between their adjacent faces to be lessened or increased at will. Each bar G is beveled downward and inward, so as, in connection with the opposite bar G, to form a trough or chute having inclined sides and an open bottom, and said bars are divided into independent sections which correspond in length and position to the width and location of the platforms E. The space below each section of the adjustable bars G is inclosed by means of a funnel, H, composed of cloth or other flexible material, from which funnel a tube, $h$, of the same material extends downward to or near the platform E.

The apparatus thus constructed is used in connection with another similar apparatus, the same being arranged with their highest ends adjacent and separated by a table, upon which is placed a box of fruit for sizing. An operative stands at each end of said table, and, taking an orange in his hand, determines its quality and places it within the chute at his right or left hand, one of said apparatus being for the highest grade and the other for the second grade. Upon each platform E is placed a fruit-box, L, which is divided by a transverse partition into two compartments, each of which is directly below one of the tubes $h$ and in position to receive oranges passing downward through the same. The spaces between the adjustable bars G increase in width from the upper end of the chute to its lower end, and when an orange is placed within said upper end and permitted to roll downward, it will continue its course until it reaches a point where it can pass between said bars and fall into the fruit-box below. Should said orange be of the smallest size it will pass immediately into the first box, but if of a larger size then it will pass downward until it encounters a space sufficient to permit it to drop into a box. The flexible tubes cause the fruit to be conveyed safely into the boxes and prevent displacement or injury, while, by means of the spring-supports of the platforms, each box will drop downward as filled, so as to prevent the clogging of said tubes.

By means of this apparatus two persons will perform more and better work than could be done by twenty persons operating with the usual appliances.

Having thus fully set forth the nature and merits of my invention, what I claim as new is—

1. An apparatus for sizing fruit having an inclined open-bottom chute provided with sectional adjustable sides, whereby several widths of opening may be produced, through which the fruit may drop while rolling down said chute, substantially as and for the purpose specified.

2. In combination with apparatus for sizing fruit, a vertically-movable platform for sustaining a fruit-box, supported by or upon springs, and adapted to automatically drop downward as said box is filled, substantially as and for the purpose shown.

3. In combination with the open bottom of the inclined chute, flexible funnels and tubes for conveying fruit to the receiving-boxes, substantially as and for the purpose set forth.

4. The apparatus described, in which the inclined open-bottomed chute having several widths of opening, the flexible funnels and tubes, and the vertically-movable spring-supported platforms are combined to operate substantially as and for the purpose specified.

In testimony that I claim the foregoing I have hereunto set my hand this 6th day of August, 1881.

HOWARD B. STEVENS.

Witnesses:
WM. LUTZENBERGER,
A. E. LEITCH.